US011441933B2

(12) United States Patent
Chang

(10) Patent No.: US 11,441,933 B2
(45) Date of Patent: Sep. 13, 2022

(54) SIGNAL PROCESSING CIRCUIT AND RELATED CHIP, FLOW METER AND METHOD

(71) Applicant: SHENZHEN GOODIX TECHNOLOGY CO., LTD., Guangdong (CN)

(72) Inventor: Jung-Yu Chang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 289 days.

(21) Appl. No.: 16/883,522

(22) Filed: May 26, 2020

(65) Prior Publication Data
US 2020/0284630 A1 Sep. 10, 2020

Related U.S. Application Data

(63) Continuation of application No. PCT/CN2019/074367, filed on Feb. 1, 2019.

(51) Int. Cl.
*G01F 1/667* (2022.01)
*G01F 25/10* (2022.01)
(Continued)

(52) U.S. Cl.
CPC ............... *G01F 1/668* (2013.01); *G01F 1/66* (2013.01); *G01F 1/667* (2013.01); *G01F 15/02* (2013.01);
(Continued)

(58) Field of Classification Search
CPC . G01F 1/66; G01F 1/667; G01F 1/668; G01F 15/02; G01F 25/10; G01N 29/44;
(Continued)

(56) References Cited

U.S. PATENT DOCUMENTS 9,134,156 B2 9/2015 Ramsay
2018/0335330 A1* 11/2018 Gestner .................. G01F 1/667

FOREIGN PATENT DOCUMENTS

CN 108154672 A 6/2018
JP A-6-201425 A 7/1994
(Continued)

OTHER PUBLICATIONS

English Abstract of JP-A-6-201425.
English Abstract of CN108154672A.

*Primary Examiner* — Benjamin R Schmitt
(74) *Attorney, Agent, or Firm* — WPAT, P.C., Intellectual Property Attorneys; Anthony King

(57) ABSTRACT

The present application discloses a signal processing circuit (100), coupled to a first transducer (102) and a second transducer (104), wherein there is a distance greater than zero between the first transducer and the second transducer, and a fluid having a flow velocity flows sequentially through the first transducer and the second transducer; the signal processing circuit includes: a first transmitter (106), coupled to the first transducer; a first receiver (108), coupled to the first transducer; a second transmitter (110), coupled to the second transducer; a second receiver (112), coupled to the second transducer; and a control unit (114), coupled to the first transmitter, the first receiver, the second transmitter and the second receiver. The present application further provides a related chip, a flow meter and a method.

20 Claims, 9 Drawing Sheets

(51) Int. Cl.
    *G01F 15/02*     (2006.01)
    *G01F 1/66*     (2022.01)
    *G01N 29/44*     (2006.01)
    *G01N 29/024*     (2006.01)

(52) U.S. Cl.
    CPC ........... *G01F 25/10* (2022.01); *G01N 29/024* (2013.01); *G01N 29/4454* (2013.01)

(58) Field of Classification Search
    CPC .. G01N 29/4454; G01N 29/024; G01N 29/30; G01N 29/222
    See application file for complete search history.

(56) References Cited

FOREIGN PATENT DOCUMENTS

| | | |
|---|---|---|
| WO | WO2006019487 A2 | 2/2006 |
| WO | 2017040267 A1 | 3/2017 |
| WO | 2018116071 A1 | 6/2018 |

* cited by examiner

200

202: when the flow velocity is zero, generating a first signal and determining a first delay time for the first signal passing through the first transmitter and the first transducer to the second transducer and then passing through the second receiver 204: when the flow velocity is zero, generating a second signal and determining a second delay time for the second signal passing through the first transmitter and the first transducer to the second transducer and bouncing back to the first transducer, then bouncing back to the second transducer, and then passing through the second transducer and the second receiver 206: when the flow velocity is zero, generating a third signal and determine a third delay time for the third signal passing through the second transmitter and the second transducer to the first transducer and then passing through the first receiver 208: obtaining the first parameters according to the first delay time and the second delay time 210: obtaining the second parameters according to the first delay time and the third delay time

212
when the flow velocity is a first specific flow velocity greater than zero, generating a fourth signal and determining a fourth delay time for the fourth signal passing through the first transmitter and the first transducer to the second transducer and then passing through the second receiver

214
when the flow velocity is the first specific flow velocity, generating a fifth signal and determining a fifth delay time for the fifth signal passing through the second transmitter and the second transducer to the first transducer and then passing through the first receiver

216
obtaining the distance according to the first specific flow velocity, a second parameter of the at least two second parameters that corresponds to said one temperature of the at least two temperatures, the fourth delay time and the fifth delay time

302
generating a sixth signal and determining a sixth delay time for the sixth signal passing through the first transmitter and the first transducer to the second transducer and then passing through the second receiver 304
generating a seventh signal and determining a seventh delay time for the seventh signal passing through the first transmitter and the first transducer to the second transducer and bouncing back to the first transducer, then bouncing back to the second transducer, and then passing through the second transducer and the second receiver 306
generating an eighth signal and determining an eighth delay time for the eighth signal passing through the second transmitter and the second transducer to the first transducer and then passing through the first receiver 308
obtaining a first factor according to the sixth delay time and the seventh delay time 310
finding a first parameter that is closest to the first factor from the at least two first parameters and find a corresponding second parameter 312
obtaining the flow velocity according to the distance, the sixth delay time, the eighth delay time and the corresponding second parameter

```
                                                    402
┌──────────────────────────────────────────┐
│ when the flow velocity is zero, generating a │
│ ninth signal and determining a ninth delay   │
│ time for the ninth signal passing through    │
│ the first transmitter and the first transducer│
│ to the second transducer and then passing    │
│ through the second receiver                  │
└──────────────────────────────────────────┘
                      │                      404
                      ▼
┌──────────────────────────────────────────┐
│ when the flow velocity is zero, generating a │
│ tenth signal and determining a tenth delay   │
│ time for the tenth signal passing through the│
│ second transmitter and the second            │
│ transducer to the first transducer and then  │
│ passing through the first receiver           │
└──────────────────────────────────────────┘
                      │                      406
                      ▼
┌──────────────────────────────────────────┐
│ obtaining the second parameters according   │
│ to the ninth delay time and the tenth delay │
│ times                                        │
└──────────────────────────────────────────┘
```

408 — when the flow velocity is a second specific flow velocity, generating an eleventh signal and determining an eleventh delay time for the eleventh signal passing through the first transmitter and the first transducer to the second transducer and then passing through the second receiver 410 — when the flow velocity is the second specific flow velocity, generating a twelfth signal and determining a twelfth delay time for the twelfth signal passing through the second transmitter and the second transducer to the first transducer and then passing through the first receiver 412 — when the flow velocity is the second specific flow velocity, generating a thirteenth signal and determining a thirteenth delay time for the thirteenth signal passing through the first transmitter and the first transducer to the second transducer and bouncing back to the first transducer, and then passing through the first transducer and the first receiver 414 — when the flow velocity is the second specific flow velocity, generating a fourteenth signal and determining a fourteenth delay time for the fourteenth signal passing through the second transmitter and the second transducer to the first transducer and bouncing back to the second transducer, and then passing through the second transducer and the second receiver 416 — obtaining the first parameters according to the eleventh delay time, the twelfth delay time, the thirteenth delay time and the fourteenth delay time

418 when the flow velocity is a third specific flow velocity greater than zero, generating a fifteenth signal and determining a fifteenth delay time for the fifteenth signal passing through the first transmitter and the first transducer to the second transducer and then passing through the second receiver

420 when the flow velocity is the third specific flow velocity, generating a sixteenth signal and determining a sixteenth delay time for the sixteenth signal passing through the second transmitter and the second transducer to the first transducer and then passing through the first receiver

422 obtaining the distance according to the third specific flow velocity, the second parameter of the at least two second parameters that corresponds to said one temperature of the at least two temperatures, the fifteenth delay time and the sixteenth delay time

502 — generating a seventeenth signal and determining a seventeenth delay time for the seventeenth signal passing through the first transmitter and the first transducer to the second transducer and then passing through the second receiver 504 — generating an eighteenth signal and determining an eighteenth delay time for the eighteenth signal passing through the second transmitter and the second transducer to the first transducer and then passing through the first receiver 506 — generating a nineteenth signal and determining a nineteenth delay time for the nineteenth signal passing through the first transmitter and the first transducer to the second transducer and bouncing back to the first transducer, and then passing through the first transducer and the first receiver 508 — generating a twentieth signal and determining a twentieth delay time for the twentieth signal passing through the second transmitter and the second transducer to the first transducer and bouncing back to the second transducer, and then passing through the second transducer and the second receiver 510 — obtaining a second factor according to the seventeenth delay time, the eighteenth delay time, the nineteenth delay time and the twentieth delay time 512 — finding a first parameter from the at least two first parameters that is closest to the second factor and find a corresponding second parameter 514 — obtaining the flow velocity according to the distance, the seventeenth delay time, the eighteenth delay time and the corresponding second parameter

FIG. 9

SIGNAL PROCESSING CIRCUIT AND RELATED CHIP, FLOW METER AND METHOD

CROSS-REFERENCE TO RELATED APPLICATIONS

This application is a continuation of International Application No. PCT/CN2019/074367, filed on Feb. 1, 2019, the disclosure of which is hereby incorporated by reference in its entirety.

TECHNICAL FIELD

The present application relates generally to a signal processing circuit and a related chip, a flow meter and a method.

BACKGROUND

Ultrasonic flow meters are common flow meters; flow meters are widely used in detecting the flow velocity of the fluid; compared with other types of flow meters, ultrasonic flow meters are advantageous in aspects such as pressure loss, least detectable flow and installation cost, whereas the accuracy still needs to be improved, and further improvements and innovations are needed.

SUMMARY OF THE INVENTION

One of the purposes of the present application is directed to a signal processing circuit and a related chip, a flow meter and a method, so as to address the above-mentioned issues.

One embodiment of the present application discloses a signal processing circuit, which is coupled to first transducer and the second transducer, wherein there is a distance greater than zero between the first transducer and the second transducer, and a fluid having a flow velocity flows sequentially through the first transducer and the second transducer. The signal processing circuit includes: a first transmitter, coupled to the first transducer; a first receiver, coupled to the first transducer; a second transmitter, coupled to the second transducer; a second receiver, coupled to the second transducer; and a control unit, coupled to the first transmitter, the first receiver, the second transmitter and the second receiver. The control unit is configured to: during an initializing stage, initializing stage, obtain at least two first parameters corresponding to at least two temperatures, at least two second parameters corresponding to the at least two temperatures and the distance; and during a normal stage, obtain the flow velocity according to the at least two first parameters, the at least two second parameters and the distance; wherein the at least two first parameters are related to the distance and a current acoustic speed corresponding to a current temperature; and the at least two second parameters are related to a delay time of the first transmitter, the first receiver, the second transmitter, the second receiver, the first transducer and the second transducer One embodiment of the present application discloses a chip, including the above signal processing circuit.

One embodiment of the present application discloses a flow meter, which includes the above signal processing circuit; the above first transducer; and the above second transducer; wherein the signal processing circuit is coupled to the first transducer and the second transducer.

One embodiment of the present application discloses a signal processing method, which is configured to control a first transmitter, a first receiver, a second transmitter and a second receiver, in which the first transmitter and the first receiver are coupled to first transducer, and the second transmitter and the second receiver are coupled to second transducer, wherein there is a distance greater than zero between the first transducer and the second transducer, and a fluid having a flow velocity flows sequentially through the first transducer and the second transducer; and the signal processing method includes: during an initializing stage, obtaining at least two first parameters corresponding to at least two temperatures, at least two second parameters corresponding to the at least two temperatures and the distance; during a normal stage, obtaining the flow velocity according to the at least two first parameters, the at least two second parameters and the distance; wherein the at least two first parameters are related to the distance and a current acoustic speed corresponding to a current temperature; and the at least two second parameters are related to a delay time of the first transmitter, the first receiver, the second transmitter, the second receiver, the first transducer and the second transducer.

The present signal processing circuit and a related chip, a flow meter and a method for use in processing the transducer receiving signal can improve the accuracy of flow meters.

BRIEF DESCRIPTION OF THE DRAWINGS

FIG. 3 is a flow diagram illustrating a control unit obtaining the at least two first parameters and the at least two second parameters during the initializing stage, according to the first embodiment of the present application.

FIG. 4 is a flow diagram illustrating a control unit obtaining the distance during the initializing stage, according to the first embodiment of the present application.

FIG. 5 is a flow diagram illustrating a control unit obtaining the flow velocity according to the at least two first parameters, the at least two second parameters and the distance during the normal stage, according to the first embodiment of the present application.

FIG. 6 is a flow diagram illustrating a control unit obtaining the at least two second parameters during the initializing stage, according to the second embodiment of the present application.

FIG. 7 is a flow diagram illustrating a control unit obtaining the at least two first parameters during the initializing stage, according to the second embodiment of the present application.

FIG. 8 is a flow diagram illustrating a control unit obtaining the distance during the initializing stage, according to the second embodiment of the present application.

FIG. 9 is a flow diagram illustrating a control unit obtaining obtain the flow velocity according to the at least two first parameters, the at least two second parameters and the distance during the normal stage, according to the second embodiment of the present application.

Figure 1:
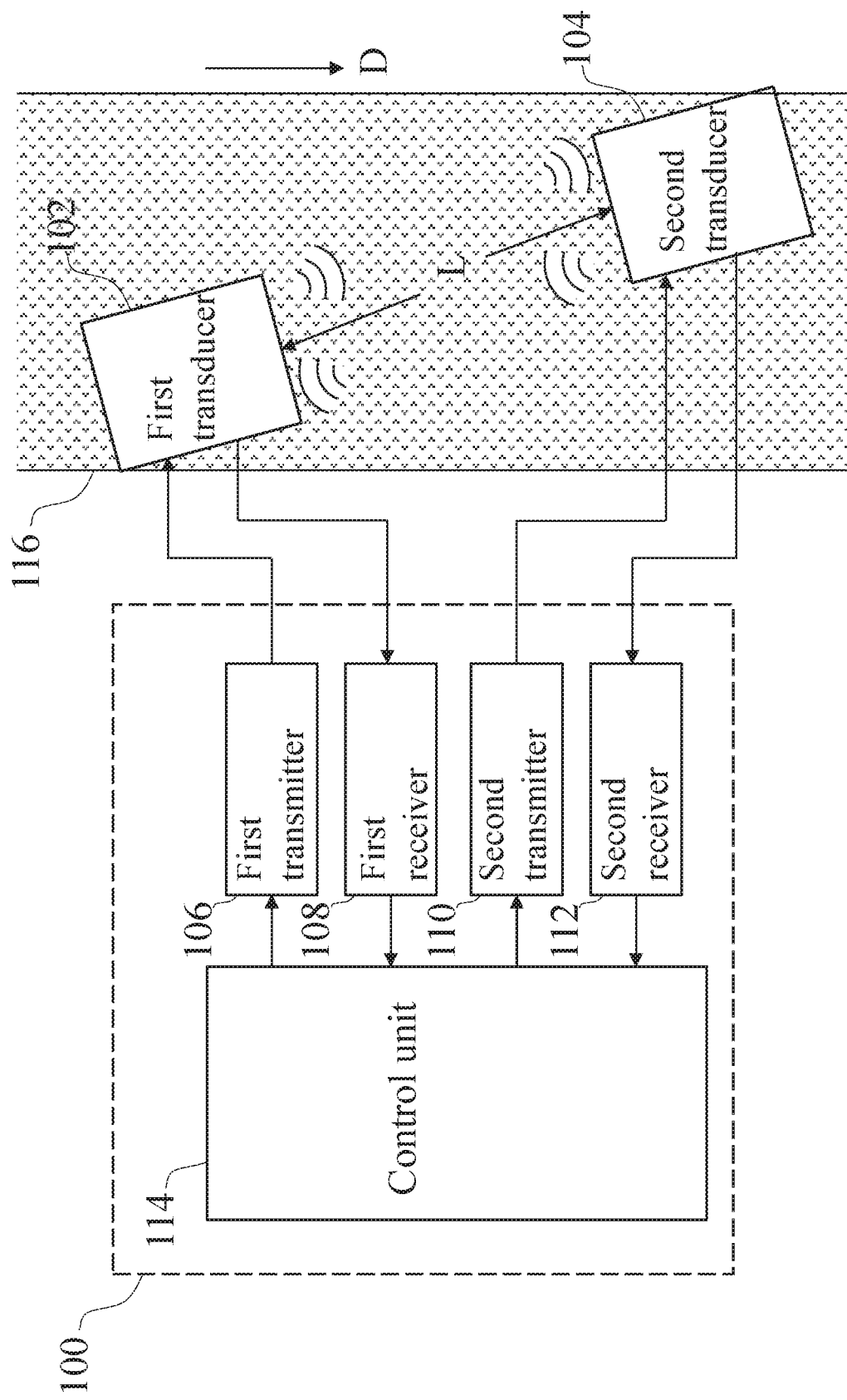
FIG. 1 is a schematic diagram illustrating a signal processing circuit for use in a flow meter, according to embodiments of the present application.

Reference numerals used is the drawings are summarized below:
100 Signal processing circuit
102, 104 Transducer
106, 110 Transmitter
108, 112 Receiver 114 Control unit
200, 300, 400, 500 Flows
202~216, 302~312, 402~422, 502~514 Steps

DETAILED DESCRIPTION

The following disclosure provides many different embodiments, or examples, for implementing different features of the application. Specific examples of components and arrangements are described below to simplify the present disclosure. These are, of course, merely examples and are not intended to be limiting. For example, the formation of a first feature over or on a second feature in the description that follows may include embodiments in which the first and the second features are formed in direct contact, and may also include embodiments in which additional features may be formed between the first and the second features, such that the first and the second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for the ease of the description to describe one element or feature's relationship with respect to another element(s) or feature(s) as illustrated in the drawings. The spatially relative terms are intended to encompass different orientations of the device in use or operation in addition to the orientation depicted in the figures. The apparatus may be otherwise oriented (e.g., rotated by 90 degrees or at other orientations) and the spatially relative descriptors used herein may likewise be interpreted accordingly.

Notwithstanding that the numerical ranges and parameters setting forth the broad scope of the application are approximations, the numerical values set forth in the specific examples are reported as precisely as possible. Any numerical value, however, inherently contains certain errors necessarily resulting from the standard deviation found in the respective testing measurements. Also, as used herein, the term "about" generally means within 10%, 5%, 1%, or 0.5% of a given value or range. Alternatively, the term "about" means within an acceptable standard error of the mean when considered by one of ordinary skill in the art. As could be appreciated, other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the term "about." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as from one endpoint to another endpoint or between two endpoints. All ranges disclosed herein are inclusive of the endpoints, unless specified otherwise.

The present application provides a signal processing circuit 100, which configured to calculate a current flow velocity v; the present application also provides a chip, which includes the signal processing circuit 100 or a signal processing circuit 200. In some embodiments, the signal processing circuit 100/200 can be used in a transducer device; for example, the present application also provides a flow meter, which includes the signal processing circuit 100/200 and a transducer 102. For example, said flow meter can be used to detect flow velocity and/or flow rate of gases or liquids, however, the present application is not limited thereto.

FIG. 1 is a schematic diagram illustrating a signal processing circuit 100 used in a flow meter, according to embodiments of the present application. The signal processing circuit 100 is coupled to a first transducer 102 and a second transducer 104. The transducer is a component capable of transforming energy from one form into another form. These energy forms may include electric energy, mechanic energy, electromagnetic energy, solar energy, chemical energy, acoustic energy and thermal energy, etc.; however, the present application is not limited thereto, and the transducer may include any component capable of transforming energy.

The first transducer 102 and the second transducer 104 are disposed in a pipeline 116, and the transmission direction of the first transducer 102 faces the second transducer 104; the transmission direction of the second transducer 104 faces the first transducer 102. There is a distance L between the first transducer 102 and the second transducer 104, and L is greater than zero. Fluid (such as, liquid or gas) having the flow velocity v flows along the disposition direction D of the pipeline 116 and passes sequentially through the first transducer 102 and the second transducer 104.

The signal processing circuit 100 includes a first transmitter 106 and a first receiver 108, both of which are coupled to the first transducer 102, and a second transmitter 110 and a second receiver 112, both of which are coupled to the second transducer 104. The signal processing circuit 100 further includes a control unit 114 coupled to first transmitter 106, the first receiver 108, the second transmitter 110 and the second receiver 112. The signal processing circuit 100 is configured to generate the flow velocity v according to the result obtained from the first transducer 102 and the second transducer 104.

Figure 2:
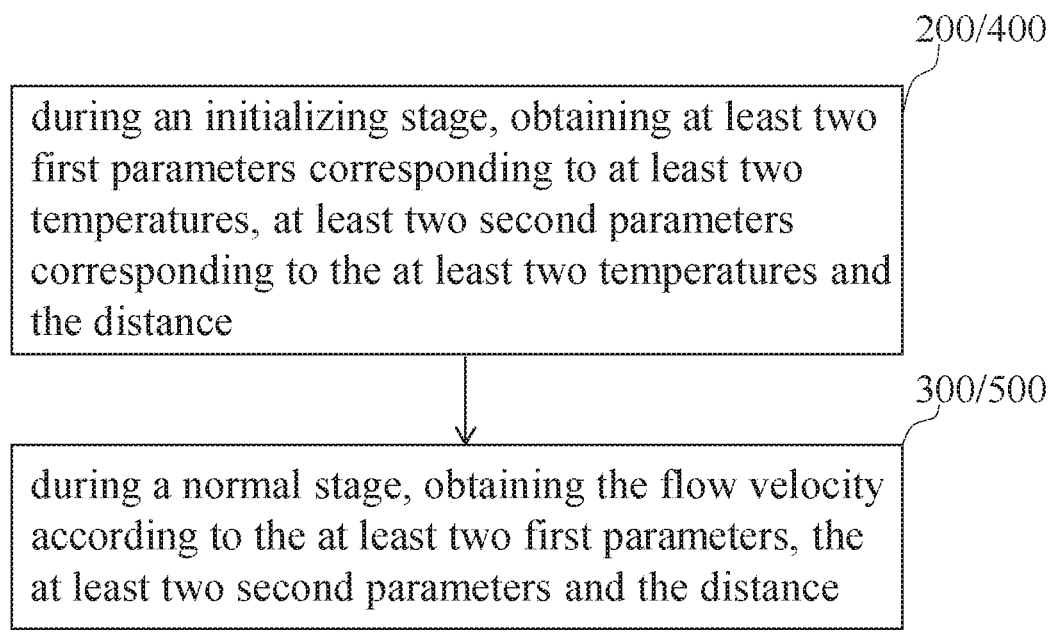
FIG. 2 is a flow diagram illustrating a control unit calculating the flow velocity, according to embodiments of the present application.

FIG. 2 is a flow diagram illustrating that a control unit 114 calculates the flow velocity v, according to embodiments of the present application. In Step 200/400, during an initializing stage, the control unit 114 is configured to obtain at least two first parameters (L/c, c is the current acoustic speed, and the value thereof is affected by the temperature) corresponding to at least two temperatures, at least two second parameters $(t_{TX2}+t_{RX21}-t_{TX1}-t_{RX12})$, wherein, $t_{TX2}$ is the delay time for the second transmitter 110 and the second transducer 104 transmitting the signal, $t_{RX21}$ is the delay time for the signal from the second transmitter 110 being received by the first transducer 102 and the first receiver 108, $t_{TX1}$ is the delay time for the first transmitter 106 and the first transducer 102 transmitting the signal, and $t_{RX12}$ is the delay time for the signal from the first transmitter 106 being received by the second transducer 104 and the second receiver 112, wherein all the above-mentioned values are affected by the temperature) corresponding to the at least two temperatures, and the distance L. In the present embodiment, the at least two temperatures are used for illustrative purposes; generally, it is more ideal that a greater number of sampling temperatures are used and a broader and denser scope is covered. For example, the control unit 114 can calculate ten first parameters and ten second parameters respectively corresponding to ten different temperatures (15° C., 16° C., 17° C., 18° C., 19° C., 20° C., 21° C., 22° C., 23° C., and 24° C.). The interval between the at least two temperatures is not particularly limited; for example, said ten different temperatures may be 15.1° C., 16.5° C., 17.8° C., 18.2° C., 19.7° C., 20.5° C., 21.4° C., 22.6° C., 23.9° C., and 24.1° C.).

In Step 300/500, during a normal stage, the control unit 114 is configured to obtain the flow velocity v according to the at least two first parameters, the at least two second parameters and the distance L. The normal stage is a stage other than the initializing stage, specifically, during the normal stage, the signal processing circuit 100 can be used to measure the flow velocity v of the fluid flowing sequentially through the first transducer 102 and the second transducer 104. Specifically, the control unit 114 can obtain the corresponding first parameter and the second parameter by looking up from a table including the at least two first parameters, without the need to determine the current temperature T, and therefore, it is feasible to eliminate the error resulted from the temperature sensor and improve the accuracy when measuring the flow velocity. It should be noted that the flow 200 and the flow 400 are interchangeable, whereas the flow 300 and the flow 500 are interchangeable.

FIG. 3 and FIG. 4 are flow diagrams illustrating that, during the initializing stage, the present control unit 114 obtains the at least two first parameters, the at least two second parameters and the distance L, according to the first embodiment of the present application. During this stage, the flow velocity v can be controlled, and hence, the value of the flow velocity is known. First, Step 202 to Step 210 in FIG. 3 are steps showing that during the initializing stage, the flow meter obtains at least two first parameters corresponding to at least two temperatures and at least two second parameters corresponding to at least two temperatures.

In Step 202, the flow velocity v of the fluid in the pipeline 116 is controlled to be 0; that is, the fluid is not flowing. The control unit 114 generates a first signal and determines the first delay time TM12 for the first signal passing through the first transmitter 106 and the first transducer 102, thereby directly triggering the second transducer 104 and then passing through the second receiver 112, which can be expressed with the equation as follows:

$$TM12 = t_{TX1} + t_{RX12} + t_{12} = t_{TX1} + t_{RX12} + L/c \quad (1)$$

wherein, $t_{12}$ is the time that the signal (such as, the first signal) travels from the first transducer 102 to the second transducer 104.

Next, in Step 204, the flow velocity v of the fluid in the pipeline 116 is still controlled at zero, and the control unit 114 generates a second signal and determine a second delay time TE12 for the second signal passing through the first transmitter 106 and the first transducer 102 to the second transducer 104 and bounces back to first transducer 102, and then bounces back to second transducer 104, and then passes through the second transducer 104 and a second receiver 112, which can be expressed with the equation as follows:

$$TE12 = t_{TX1} + t_{RX12} + t_{12} + t_{21} + t_{12} = t_{TX1} + t_{RX12} + 3*L/c \quad (2)$$

Therefore, a first parameter L/c can be obtained according to equation (1) and equation (2):

$$L/c = (TE12 - TM12)/2 \quad (3)$$

Next, in Step 206, the flow velocity v of the fluid in the pipeline 116 is still controlled at zero, the control unit 114 generates a third signal and determines a third delay time TM21 for the third signal passing through the second transmitter 110 and the second transducer 104 to the first transducer 102 and then passing through the first receiver 108, which can be expressed with the equation as follows:

$$TM21 = t_{TX2} + t_{RX21} + t_{21} = t_{TX2} + t_{RX21} + L/c \quad (4)$$

A second parameter $t_{TX2} + t_{RX21} - t_{TX1} - t_{RX12}$ can be obtained according to equation (1) and equation (4):

$$TM21 - TM12 = t_{TX2} + t_{RX21} - t_{TX1} - t_{RX12} \quad (5)$$

Hence, in Step 208, the first parameter can be obtained according to the first delay time TM12 and the second delay time TE12 from equation (3); and in Step 210, the second parameter can be obtained according to the first delay time TM12 and the third delay time TM21 from equation (5).

By repetitively performing Step 202 to Step 210 under the at least two temperatures, the control unit 114 can obtain at least two first parameters and at least two second parameters corresponding to the at least two temperatures, and the control unit 114 can also store the at least two first parameters and at least two second parameters so that in the subsequent normal stage this information can be used as a lookup table.

Step 212 to Step 216 in FIG. 4 are steps showing that during the initializing stage, the flow meter obtains the distance L; specifically, under one temperature of the at least two temperatures, the signal processing circuit 100 obtain the distance L between the first transducer 102 and the second transducer 104; although the first transducer 102 and the second transducer 104 are disposed in advance, there may be some deviation to the distance L, and hence, Step 212 to Step 216 can be used to obtained an accurate distance L so as to facilitate the calculation of the flow velocity v the normal stage.

In Step 212, the flow velocity v of the fluid is controlled at a first specific flow velocity vs1 that is greater than zero, and the control unit 114 generates a fourth signal and determines a fourth delay time $TM12_{vs1}$ for the fourth signal passing through the first transmitter 106 and the first transducer 102, thereby directly triggering the second transducer 104 and then passing through the second receiver 112, which can be expressed with the equation as follows:

$$TM12_{vs1} = t_{TX1} + t_{RX12} + L/(c + vs1) \quad (6)$$

In Step 214, the flow velocity v of the fluid is stilled controlled at the first specific flow velocity vs1 that is greater than zero, and the control unit 114 generates a fifth signal and determines a fifth delay time $TM21_{vs1}$ for the fifth signal passing through the second transmitter 110 and the second transducer 104, thereby directly triggering the first transducer 102 and then passing through the first receiver 108, which can be expressed with the equation as follows:

$$TM21_{vs1} = t_{TX2} + t_{RX21} + L/(c - vs1) \quad (7)$$

Hence, the following equation can be obtained according to equation (6) and equation (7):

$$L \approx 2*vs1*TM12_{vs1}*TM21_{vs1}/((TM21_{vs1} - TM12_{vs1}) - (t_{TX2} + t_{RX21} - t_{TX1} - t_{RX12})) \quad (8)$$

During this stage, since the measurement is carried out under one temperature of the at least two temperatures, it is possible to measure the second parameter $t_{TX2} + t_{RX21} - t_{TX1} - t_{RX12}$ corresponding to said temperature at the same time or immediately after Step 210; in the latter case, the second parameter $t_{TX2} + t_{RX21} - t_{TX1} - t_{RX12}$ obtained in Step 210 can be used directly; that is, at the time, the $t_{TX2} + t_{RX21} - t_{TX1} - t_{RX12}$ is a known value. Therefore, in Step 216, it is feasible to obtain the distance L using the equation (8) according to the first specific flow velocity vs1, a second parameter from the at least two second parameters, the fourth delay time $TM12_{vs}$ and the fifth delay time $TM21_{vs}$ that correspond to said one temperature of the at least two temperatures.

FIG. 5 is a flow diagram illustrating that during the normal stage, the present control unit 114 obtains the flow velocity v according to the at least two first parameters, the at least two second parameters and the distance L, according to the first embodiment of the present application. In this case, both the flow velocity v and temperature T are unknown.

In Step 302, the control unit 114 generates a sixth signal and determines a sixth delay time $TM12_v$ for the sixth signal passing through the first transmitter 106 and the first transducer 102, thereby directly triggering the second transducer 104 and then passing through the second receiver 112, which can be expressed with the equation as follows:

$$TM12_v = t_{TX1} + t_{RX12} + t_{12} = t_{TX1} + t_{RX12} + L/(c+v) \qquad (9)$$

In Step 304, the control unit 114 generates a seventh signal and determines a seventh delay time TE12 for the seventh signal passing through the first transmitter 106 and the first transducer 102 to the second transducer 104 and bouncing back to the first transducer 102, and then bouncing back to second transducer 104 and then passing through the second receiver 112, which can be expressed with the equation as follows:

$$TE12_v = t_{TX1} + t_{RX12} + t_{12} + t_{21} + t_{12} = t_{TX1} + t_{RX12} + L/(c+v) + L/(c-v) + L/(c+v) \qquad (10)$$

In Step 306, the control unit 114 generates an eighth signal and determines an eighth delay time $TM21_v$ for the eighth signal passing through the second transmitter 110 and the second transducer 104, thereby directly triggering first transducer 102 and then passing through the first receiver 108, which can be expressed with the equation as follows:

$$TM21_v = t_{TX2} + t_{RX21} + L/(c-v) \qquad (11)$$

The following equation can be obtained by subtracting equation (11) from equation (9):

$$TE12_v - TM12_v \approx 2*L/c \qquad (12)$$

Hence, in Step 308, it is feasible to obtain a first factor L/c under the current temperature according to the sixth delay time $TM12_v$ and the seventh delay time TE12 from equation (12).

In Step 310, a first parameter that is closest to the first factor L/c calculated in Step 308 is found from the at least two first parameters stored in the flow 200/400 and a corresponding second parameter is found.

Further, the equation for the flow velocity v can be obtained according to equation (9) and equation (10):

$$v \approx (L/2)*(TM21_v - TM12_v - (t_{TX2} + t_{RX21} - t_{TX1} - t_{RX12}))/(TM12_v * TM21_v) \qquad (13)$$

Therefore, in Step 312, it is feasible to obtain the current flow velocity v according to the distance L obtained from the flow 200 and the second parameter $t_{T2} + t_{RX21} - t_{TX1} - t_{RX12}$ corresponding to the current temperature T obtained by the lookup step in Step 310, and the sixth delay time $TM12_v$ and the eighth delay time $TM21_v$ from equation (13).

FIG. 6 to FIG. 8 are flow diagrams illustrating that during the initializing stage, the present control unit 114 obtains at least two first parameters, at least two second parameters and a distance L according to the second embodiment of the present application. In this embodiment, the flow velocity v can be control, and hence, the value thereof is known. First, Step 402 in FIG. 6 to Step 416 in FIG. 7 are steps showing that during the initializing stage, the flow meter obtains at least two first parameters corresponding to at least two temperatures and at least two second parameters corresponding to at least two temperatures.

In Step 402, the flow velocity v of the fluid in the pipeline 116 is controlled to be 0; that is, the fluid is not flowing. The control unit 114 generates a ninth signal and determines a ninth delay time TM12 (which is substantially the same as the equation (1)) for the ninth signal passing through the first transmitter 106 and the first transducer 102, thereby directly triggering the second transducer 104 and then passing through the second receiver 112, which can be expressed with the equation as follows:

$$TM12 = t_{TX1} + t_{RX12} + t_{12} = t_{TX1} + t_{RX12} + L/c \qquad (14)$$

Next, in Step 404, the flow velocity v of the fluid in the pipeline 116 is still controlled at zero, and the control unit 114 generates a tenth signal and determines tenth delay time TM21 (which is substantially the same as the equation (4)) for the tenth signal passing through the second transmitter 110 and the second transducer 104 to the first transducer 102 and then passing through the first receiver 108, which can be expressed with the equation as follows:

$$TM21 = t_{TX2} + t_{RX21} + t_{21} = t_{TX2} + t_{RX21} + L/c \qquad (15)$$

The second parameter $t_{TX2} + t_{RX21} - t_{TX1} - t_{RX12}$ can be obtained according to equation (14) and equation (15):

$$TM21 - TM12 = t_{TX2} + t_{RX21} - t_{TX1} - t_{RX12} \qquad (16)$$

In this way, in Step 406, it is feasible to obtain the second parameter according to a ninth delay time TM12 and a tenth delay time TM21 from equation (16).

In Step 408, the flow velocity v of the fluid in the pipeline 116 is controlled at a second flow velocity vs2, and the second specific flow velocity vs may be greater than or equal to zero, a more accurate first parameter can be obtained when the second specific flow velocity vs is zero, as compared with the case where second specific flow velocity vs is greater than zero. The control unit 114 generates an eleventh signal and determines an eleventh delay time $TM12_{vs2}$ for the eleventh signal passing through the first transmitter 106 and the first transducer 102, thereby directly triggering the second transducer 104 and then passing through the second receiver 112, which can be expressed with the equation as follows:

$$TM12_{vs2} = t_{TX1} + t_{RX12} + t_{12} = t_{TX1} + t_{RX12} + L/(c+vs2) \qquad (17)$$

In Step 410, the flow velocity v of the fluid in the pipeline 116 is stilled controlled at the second flow velocity vs2. The control unit 114 generates a twelfth signal and determines a twelfth delay time $TM21_{vs2}$ for the twelfth signal passing through the second transmitter 110 and the second transducer 104, thereby directly triggering first transducer 102 and then passing through the first receiver 108, which can be expressed with the equation as follows:

$$TM21_{vs2} = t_{TX2} + t_{RX21} + t_{21} = t_{TX2} + t_{RX21} + L/(c-vs2) \qquad (18)$$

In Step 412, the flow velocity v of the fluid in the pipeline 116 is stilled controlled at the second flow velocity vs2. The control unit 114 generates a thirteenth signal and determines a thirteenth delay time $TE11_{vs2}$ for the thirteenth signal passing through the first transmitter 106 and the first transducer 102 to the second transducer 104 and bouncing back to first transducer 102, and then passing through the first transducer 102 and the first receiver 108, which can be expressed with the equation as follows:

$$TE11_{vs2} = t_{TX1} + t_{RX11} + t_{12} + t_{21} = t_{TX1} + t_{RX11} + L/(c+vs2) + L/(c-vs2) \qquad (19)$$

In Step 414, the flow velocity v of the fluid in the pipeline 116 is stilled controlled at the second flow velocity vs2. The control unit 114 generates a fourteenth signal and determines a fourteenth delay time $TE22_{vs2}$ for the fourteenth signal passing through the second transmitter 110 and the second transducer 104 to the first transducer 102 and bouncing back to second transducer 104, and then passing through the second transducer 104 and the second receiver 112, which can be expressed with the equation as follows:

$$TE22_{vs2}=t_{TX2}+t_{RX22}+t_{21}+t_{12}=t_{TX2}+t_{RX22}+L/(c-vs2)+L/(c+vs2) \quad (20)$$

The following equation can be obtained according to equation (17) and equation (19):

$$TE11_{vs2}-TM12_{vs2}=t_{RX11}-t_{RX12}+L/(c-vs2) \quad (21)$$

The following equation can be obtained according to equation (18) and equation (20):

$$TE22_{vs2}-TM21_{vs2}=t_{RX22}-t_{RX21}+L/(c+vs2) \quad (22)$$

The following equation can be obtained according to equation (21) and equation (22):

$$2*L/c \approx TE11_{vs2}-TM12_{vs2}+TE22_{vs2}-TM21_{vs2} \quad (23)$$

Therefore, in Step 416, it is feasible to obtain the first parameter L/c according to the eleventh delay time $TM12_{vs2}$, the twelfth delay time $TM21_{vs2}$, the thirteenth delay time $TE11_{vs2}$ and the fourteenth delay time $TE22_{vs2}$.

By repetitively performing Step 402 to Step 416 under the at least two temperatures, the control unit 114 can obtain at least two first parameters and at least two second parameters corresponding to the at least two temperatures, and the control unit 114 can also store the at least two first parameters and at least two second parameters so that in the subsequent normal stage this information can be used as a lookup table.

Step 418 to Step 422 in FIG. 8 are steps showing that during the initializing stage, the flow meter obtains the distance L; specifically, under one temperature of the at least two temperatures, the signal processing circuit 100 is used to obtain the distance L between the first transducer 102 and the second transducer 104; although the first transducer 102 and the second transducer 104 are disposed in advance, there may be some deviation to the distance L may, and hence, Step 418 to Step 422 can be used to obtained an accurate distance L so as to facilitate the calculation of the flow velocity v the normal stage.

In Step 418, the flow velocity v of the fluid is controlled at a third specific flow velocity that is greater than zero vs3, and the control unit 114 generates a fifteenth signal and determines a fifteenth delay time $TM12_{vs3}$ for the fifteenth signal passing through the first transmitter 106 and the first transducer 102, thereby directly triggering second transducer 104 and then passing through the second receiver 112, which can be expressed with the equation as follows:

$$TM12_{vs3}=t_{TX1}+t_{RX12}+L/(c+vs3) \quad (24)$$

In Step 420, the flow velocity v of the fluid is stilled controlled at the a third specific flow velocity greater than zero vs3, the control unit 114 generates a sixteenth signal and determines a sixteenth delay time $TM21_{vs3}$ for the sixteenth signal passing through the second transmitter 110 and the second transducer 104, thereby directly triggering first transducer 102 and then passing through the first receiver 108, which can be expressed with the equation as follows:

$$TM21_{vs3}=t_{TX2}+t_{RX21}+L/(c-vs2) \quad (25)$$

Therefore, the following equation can be obtained according to equation (24) and equation (25):

$$L \approx 2*vs3*TM12_{vs3}*TM21_{vs3}/((TM21_{vs3}-TM12_{vs3})-(t_{TX2}+t_{RX21}-t_{TX1}-t_{RX12})) \quad (26)$$

During this stage, since the measurement is carried out under one temperature of the at least two temperatures, it is possible to measure the second parameter $t_{TX2}+t_{RX21}-t_{TX1}-t_{RX12}$ corresponding to said temperature at the same time or immediately after Step 406; in the latter case, the second parameter $t_{TX2}+t_{RX2}-t_{TX1}-t_{RX12}$ obtained in Step 406 can be used directly; that is, at the time, the $t_{TX2}+t_{RX21}-t_{TX1}-t_{RX12}$ is a known value. Therefore, in Step 422, it is feasible to obtain the distance L using the equation (9) according to the third specific flow velocity vs3, a second parameter from the at least two second parameters that corresponds to said one temperature of the at least two temperatures, the fifteenth delay time $TM12_{vs3}$ and the sixteenth delay time $TM21_{vs3}$.

FIG. 9 is a flow diagram illustrating that during the normal stage, the present control unit 114 obtains the flow velocity v according to the at least two first parameters, the at least two second parameters and the distance L, according to the second embodiment of the present application. In this case, both the flow velocity v and the temperature T are unknown.

In Step 502, the control unit 114 generates a seventeenth signal and determines a seventeenth delay time $TM12_v$ for the seventeenth signal passing through the first transmitter 106 and the first transducer 102, thereby directly triggering second transducer 104 and then passing through the second receiver 112, which can be expressed with the equation as follows:

$$TM12_v=t_{TX1}+t_{RX12}+t_{12}=t_{TX1}+t_{RX12}+L/(c+v) \quad (27)$$

In Step 504, the control unit 114 generates an eighteenth signal and determines an eighteenth delay time $TM21_v$ for the eighteenth signal passing through the second transmitter 110 and the second transducer 104, thereby directly triggering first transducer 102 and then passing through the first receiver 108, which can be expressed with the equation as follows:

$$TM21_v=t_{TX2}+t_{RX21}+t_{21}=t_{TX2}+t_{RX21}+L/(c-v) \quad (28)$$

In Step 506, the control unit 114 generates a nineteenth signal and determines a nineteenth delay time $TE11_{vs2}$ for the nineteenth signal passing through the first transmitter 106 and the first transducer 102 to the second transducer 104 and bouncing back to first transducer 102, and then passing through the first transducer 102 and the first receiver 108, which can be expressed with the equation as follows:

$$TE11_v=t_{TX1}+t_{RX11}+t_{12}+t_{21}=t_{TX1}+t_{RX1}+L/(c+V)+L/(c-v) \quad (29)$$

In Step 508, the control unit 114 generates a twentieth signal and determines a twentieth delay time $TE22_{vs2}$ for the twentieth signal passing through the second transmitter 110 and the second transducer 104 to the first transducer 102 and bouncing back to the second transducer 104, and then passing through the second transducer 104 and the second receiver 112, which can be expressed with the equation as follows:

$$TE22_v=t_{TX2}+t_{RX22}+t_{21}+t_{12}=t_{TX2}+t_{RX22}+L/(c-v)+L/(c+v) \quad (30)$$

The following equation can be obtained according to equation (27) and equation (29):

$$TE11_v-TM12_v=t_{RX11}-t_{RX12}+L/(c-v) \quad (31)$$

The following equation can be obtained according to equation (28) and equation (30):

$$TE22_v-TM21_v=t_{RX22}-t_{RX21}+L/(c+v) \quad (32)$$

The following equation can be obtained according to equation (31) and equation (32):

$$2*L/c \approx TE11_v - TM12_v + TE22_v - TM21_v \quad (33)$$

In Step 510, it is feasible to obtain a second factor L/c under the current temperature according to the seventeenth delay time $TM12_v$, the eighteenth delay time $TM21_v$, the nineteenth delay time $TE11_{vs2}$ and the twentieth delay time $TE22_{vs2}$ from equation (33).

In Step 512, a first parameter that is closest to the second factor L/c calculated in Step 510 is found from the at least two first parameters stored in the flow 200/400 and a corresponding second parameter are found.

The equation for the flow velocity v (which is substantially the same as the equation (13)) can then be obtained according to equation (26) and equation (27):

$$v \approx (L/2)*((TM21_v - TM12_v) - (t_{TX2} + t_{RX21} - t_{TX1} - t_{RX12}))/(TM12_v*TM21_v) \quad (34)$$

Therefore, in Step 514, it is feasible to obtain the current flow velocity v according to the distance L obtained from the flow 200 and the second parameter $t_{TX2} + t_{RX1} - t_{X1} - t_{RX12}$ corresponding to the current temperature T obtained by the lookup step in Step 512, and the seventeenth delay time $TM12_v$ and the eighteenth delay time $TM21_v$ from equation (34).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A signal processing circuit, characterized in that the signal processing circuit is coupled to a first transducer and a second transducer, wherein there is a distance greater than zero between the first transducer and the second transducer, and a fluid having a flow velocity flows sequentially through the first transducer and the second transducer, and the signal processing circuit comprises:
    a first transmitter, coupled to the first transducer;
    a first receiver, coupled to the first transducer;
    a second transmitter, coupled to the second transducer;
    a second receiver, coupled to the second transducer; and
    a control unit, coupled to the first transmitter, the first receiver, the second transmitter and the second receiver, wherein the control unit is configured to:
        during an initializing stage, obtain at least two first parameters corresponding to at least two temperatures, at least two second parameters corresponding to the at least two temperatures, and obtain the distance at least according to one of the at least two second parameters; and
        during a normal stage, obtain the flow velocity according to the at least two first parameters, the at least two second parameters and the distance without measuring a current temperature by using a temperature sensor;
    wherein the at least two first parameters are related to the distance and a current acoustic speed corresponding to the current temperature; the at least two second parameters are related to a delay time of the first transmitter, the first receiver, the second transmitter, the second receiver, the first transducer and the second transducer.

2. The signal processing circuit of claim 1, characterized in that during the initializing stage and under the at least two temperatures, the control unit is further configured to:
    when the flow velocity is zero, generate a first signal and determine a first delay time for the first signal passing through the first transmitter and the first transducer to the second transducer and then passing through the second receiver;
    when the flow velocity is zero, generate a second signal and determine a second delay time for the second signal passing through the first transmitter and the first transducer to the second transducer and bouncing back to the first transducer, then bouncing back to the second transducer, and then passing through the second transducer and the second receiver;
    when the flow velocity is zero, generate a third signal and determine a third delay time for the third signal passing through the second transmitter and the second transducer to the first transducer and then passing through the first receiver;
    obtain the first parameters according to the first delay time and the second delay time; and
    obtain the second parameters according to the first delay time and the third delay time.

3. The signal processing circuit of claim 2, characterized in that during the initializing stage and under one temperature of the at least two temperatures, the control unit is further configured to:
    when the flow velocity is a first specific flow velocity greater than zero, generate a fourth signal and determine a fourth delay time for the fourth signal passing through the first transmitter and the first transducer to the second transducer and then passing through the second receiver;
    when the flow velocity is the first specific flow velocity, generate a fifth signal and determine a fifth delay time for the fifth signal passing through the second transmitter and the second transducer to the first transducer and then passing through the first receiver; and
    obtain the distance according to the first specific flow velocity, a second parameter of the at least two second parameters that corresponds to said one temperature of the at least two temperatures, the fourth delay time and the fifth delay time.

4. The signal processing circuit of claim 3, characterized in that during the normal stage, the control unit is further configured to:
    generate a sixth signal and determine a sixth delay time for the sixth signal passing through the first transmitter and the first transducer to the second transducer and then passing through the second receiver;
    generate a seventh signal and determine a seventh delay time for the seventh signal passing through the first transmitter and the first transducer to the second transducer and bouncing back to the first transducer, then bouncing back to the second transducer, and then passing through the second transducer and the second receiver;
    generate an eighth signal and determine an eighth delay time for the eighth signal passing through the second transmitter and the second transducer to the first transducer and then passing through the first receiver;

obtain a first factor according to the sixth delay time and the seventh delay time;

find a first parameter that is closest to the first factor from the at least two first parameters and find a corresponding second parameter; and obtain the flow velocity according to the distance, the sixth delay time, the eighth delay time and the corresponding second parameter.

5. The signal processing circuit of claim 1, characterized in that during the initializing stage and under the at least two temperatures, the control unit is further configured to:

when the flow velocity is zero, generate a first signal and determine a first delay time for the first signal passing through the first transmitter and the first transducer to the second transducer and then passing through the second receiver;

when the flow velocity is zero, generate a second signal and determine a second delay time for the second signal passing through the second transmitter and the second transducer to the first transducer and then passing through the first receiver; and obtain the second parameters according to the first delay time and the second delay times.

6. The signal processing circuit of claim 5, characterized in that during the initializing stage and under the at least two temperatures, the control unit is further configured to:

when the flow velocity is a second specific flow velocity, generate a third signal and determine a third delay time for the third signal passing through the first transmitter and the first transducer to the second transducer and then passing through the second receiver;

when the flow velocity is the second specific flow velocity, generate a fourth signal and determine a fourth delay time for the fourth signal passing through the second transmitter and the second transducer to the first transducer and then passing through the first receiver;

when the flow velocity is the second specific flow velocity, generate a fifth signal and determine a fifth delay time for the fifth signal passing through the first transmitter and the first transducer to the second transducer and bouncing back to the first transducer, and then passing through the first transducer and the first receiver;

when the flow velocity is the second specific flow velocity, generate a sixth signal and determine a sixth delay time for the sixth signal passing through the second transmitter and the second transducer to the first transducer and bouncing back to the second transducer, and then passing through the second transducer and the second receiver; and obtain the first parameters according to the third delay time, the fourth delay time, the fifth delay time and the sixth delay time.

7. The signal processing circuit of claim 6, characterized in that the second specific flow velocity is greater than or equal to zero.

8. The signal processing circuit of claim 7, characterized in that during the initializing stage and under one temperature of the at least two temperatures, the control unit is further configured to:

when the flow velocity is a third specific flow velocity greater than zero, generate a seventh signal and determine a seventh delay time for the seventh signal passing through the first transmitter and the first transducer to the second transducer and then passing through the second receiver;

when the flow velocity is the third specific flow velocity, generate an eighth signal and determine an eighth delay time for the eighth signal passing through the second transmitter and the second transducer to the first transducer and then passing through the first receiver; and obtain the distance according to the third specific flow velocity, the second parameter of the at least two second parameters that corresponds to said one temperature of the at least two temperatures, the seventh delay time and the eighth delay time.

9. The signal processing circuit of claim 8, characterized in that the control unit during the normal stage is further configured to:

generate a ninth signal and determine a ninth delay time for the ninth signal passing through the first transmitter and the first transducer to the second transducer and then passing through the second receiver;

generate a tenth signal and determine a tenth delay time for the tenth signal passing through the second transmitter and the second transducer to the first transducer and then passing through the first receiver;

generate an eleventh signal and determine an eleventh delay time for the eleventh signal passing through the first transmitter and the first transducer to the second transducer and bouncing back to the first transducer, and then passing through the first transducer and the first receiver;

generate a twelfth signal and determine a twelfth delay time for the twelfth signal passing through the second transmitter and the second transducer to the first transducer and bouncing back to the second transducer, and then passing through the second transducer and the second receiver;

obtain a second factor according to the ninth delay time, the tenth delay time, the eleventh delay time and the twelfth delay time;

find a first parameter from the at least two first parameters that is closest to the second factor and find a corresponding second parameter; and obtain the flow velocity according to the distance, the ninth delay time, the tenth delay time and the corresponding second parameter.

10. A flow meter, characterized by comprising:

the signal processing circuit of claim 1.

11. A chip, comprising: a signal processing circuit coupled to a first transducer and a second transducer, wherein there is a distance greater than zero between the first transducer and the second transducer, and a fluid having a flow velocity flows sequentially through the first transducer and the second transducer, and the signal processing circuit comprises:

a first transmitter, coupled to the first transducer;

a first receiver, coupled to the first transducer;

a second transmitter, coupled to the second transducer;

a second receiver, coupled to the second transducer; and a control unit, coupled to the first transmitter, the first receiver, the second transmitter and the second receiver, wherein the control unit is configured to:

during an initializing stage, obtain at least two first parameters corresponding to at least two temperatures, at least two second parameters corresponding to the at least two temperatures, and obtain the distance at least according to one of the at least two second parameters; and during a normal stage, obtain the flow velocity according to the at least two first parameters, the at least two second parameters and the distance without measuring a current temperature by using a temperature sensor;

wherein the at least two first parameters are related to the distance and a current acoustic speed corresponding to the current temperature; the at least two second parameters are related to a delay time of the first transmitter, the first receiver, the second transmitter, the second receiver, the first transducer and the second transducer.

12. A signal processing method, characterized in that the signal processing method is configured to control a first transmitter, a first receiver, a second transmitter and a second receiver, the first transmitter and the first receiver are coupled to a first transducer, the second transmitter and the second receiver are coupled to a second transducer, wherein there is a distance greater than zero between the first transducer and the second transducer, and a fluid having a flow velocity flows sequentially through the first transducer and the second transducer; and the signal processing method comprises:

during an initializing stage, obtaining at least two first parameters corresponding to at least two temperatures, at least two second parameters corresponding to the at least two temperatures, and obtain the distance at least according to one of the at least two second parameters;

during a normal stage, obtaining the flow velocity according to the at least two first parameters, the at least two second parameters and the distance without measuring a current temperature by using a temperature sensor;

wherein the at least two first parameters are related to the distance and a current acoustic speed corresponding to a current temperature; the at least two second parameters are related to a delay time of the first transmitter, the first receiver, the second transmitter, the second receiver, the first transducer and the second transducer.

13. The signal processing method of claim 12, characterized in that during the initializing stage and under the at least two temperatures, the signal processing method further comprises:

when the flow velocity is zero, generating a first signal and determining a first delay time for the first signal passing through the first transmitter and the first transducer to the second transducer and then passing through the second receiver;

when the flow velocity is zero, generating a second signal and determining a second delay time for the second signal passing through the first transmitter and the first transducer to the second transducer and bouncing back to the first transducer, then bouncing back to the second transducer, and then passing through the second transducer and the second receiver;

when the flow velocity is zero, generating a third signal and determine a third delay time for the third signal passing through the second transmitter and the second transducer to the first transducer and then passing through the first receiver;

obtaining the first parameters according to the first delay time and the second delay time; and obtaining the second parameters according to the first delay time and the third delay time.

14. The signal processing method of claim 13, characterized in that during the initializing stage and under one temperature of the at least two temperatures, the signal processing method further comprises:

when the flow velocity is a first specific flow velocity greater than zero, generating a fourth signal and determining a fourth delay time for the fourth signal passing through the first transmitter and the first transducer to the second transducer and then passing through the second receiver;

when the flow velocity is the first specific flow velocity, generating a fifth signal and determining a fifth delay time for the fifth signal passing through the second transmitter and the second transducer to the first transducer and then passing through the first receiver; and obtaining the distance according to the first specific flow velocity, a second parameter of the at least two second parameters that corresponds to said one temperature of the at least two temperatures, the fourth delay time and the fifth delay time.

15. The signal processing method of claim 14, characterized in that during the normal stage, the signal processing method further comprises:

generating a sixth signal and determining a sixth delay time for the sixth signal passing through the first transmitter and the first transducer to the second transducer and then passing through the second receiver;

generating a seventh signal and determining a seventh delay time for the seventh signal passing through the first transmitter and the first transducer to the second transducer and bouncing back to the first transducer, then bouncing back to the second transducer, and then passing through the second transducer and the second receiver;

generating an eighth signal and determining an eighth delay time for the eighth signal passing through the second transmitter and the second transducer to the first transducer and then passing through the first receiver;

obtaining a first factor according to the sixth delay time and the seventh delay time;

finding a first parameter that is closest to the first factor from the at least two first parameters and find a corresponding second parameter; and obtaining the flow velocity according to the distance, the sixth delay time, the eighth delay time and the corresponding second parameter.

16. The signal processing method of claim 12, characterized in that during the initializing stage and under the at least two temperatures, the signal processing method further comprises:

when the flow velocity is zero, generating a first signal and determining a first delay time for the first signal passing through the first transmitter and the first transducer to the second transducer and then passing through the second receiver;

when the flow velocity is zero, generating a second signal and determining a second delay time for the tenth second signal passing through the second transmitter and the second transducer to the first transducer and then passing through the first receiver; and obtaining the second parameters according to the first delay time and the second delay times.

17. The signal processing method of claim 16, characterized in that during the initializing stage and under the at least two temperatures, the signal processing method further comprises:

when the flow velocity is a second specific flow velocity, generating a third signal and determining a third delay time for the third signal passing through the first transmitter and the first transducer to the second transducer and then passing through the second receiver;

when the flow velocity is the second specific flow velocity, generating a fourth signal and determining a fourth delay time for the fourth signal passing through the second transmitter and the second transducer to the first transducer and then passing through the first receiver;

when the flow velocity is the second specific flow velocity, generating a fifth signal and determining a fifth delay time for the fifth signal passing through the first transmitter and the first transducer to the second transducer and bouncing back to the first transducer, and then passing through the first transducer and the first receiver;

when the flow velocity is the second specific flow velocity, generating a sixth signal and determining a sixth delay time for the sixth signal passing through the second transmitter and the second transducer to the first transducer and bouncing back to the second transducer, and then passing through the second transducer and the second receiver; and obtaining the first parameters according to the third delay time, the fourth delay time, the fifth delay time and the sixth delay time.

18. The signal processing method of claim 17, characterized in that the second specific flow velocity is greater than or equal to zero.

19. The signal processing method of claim 18, characterized in that during the initializing stage and under one temperature of the at least two temperatures, the signal processing method further comprises:

when the flow velocity is a third specific flow velocity greater than zero, generating a seventh signal and determining a seventh delay time for the seventh signal passing through the first transmitter and the first transducer to the second transducer and then passing through the second receiver;

when the flow velocity is the third specific flow velocity, generating an eighth signal and determining an eighth delay time for the eighth signal passing through the second transmitter and the second transducer to the first transducer and then passing through the first receiver; and obtaining the distance according to the third specific flow velocity, the second parameter of the at least two second parameters that corresponds to said one temperature of the at least two temperatures, the seventh delay time and the seventh delay time.

20. The signal processing method of claim 19, characterized in that the signal processing method during the normal stage further comprises:

generating a ninth signal and determining a ninth delay time for the ninth signal passing through the first transmitter and the first transducer to the second transducer and then passing through the second receiver;

generating a tenth signal and determining a tenth delay time for the tenth signal passing through the second transmitter and the second transducer to the first transducer and then passing through the first receiver;

generating an eleventh signal and determining an eleventh delay time for the eleventh signal passing through the first transmitter and the first transducer to the second transducer and bouncing back to the first transducer, and then passing through the first transducer and the first receiver;

generating a twelfth signal and determining a twelfth delay time for the twelfth signal passing through the second transmitter and the second transducer to the first transducer and bouncing back to the second transducer, and then passing through the second transducer and the second receiver;

obtaining a second factor according to the ninth delay time, the tenth delay time, the eleventh delay time and the twelfth delay time;

finding a first parameter from the at least two first parameters that is closest to the second factor and find a corresponding second parameter; and obtaining the flow velocity according to the distance, the ninth delay time, the tenth delay time and the corresponding second parameter.

* * * * *